A. AMSDEN.
Hydrostatic Scales.
No. 810. Patented June 27, 1838.
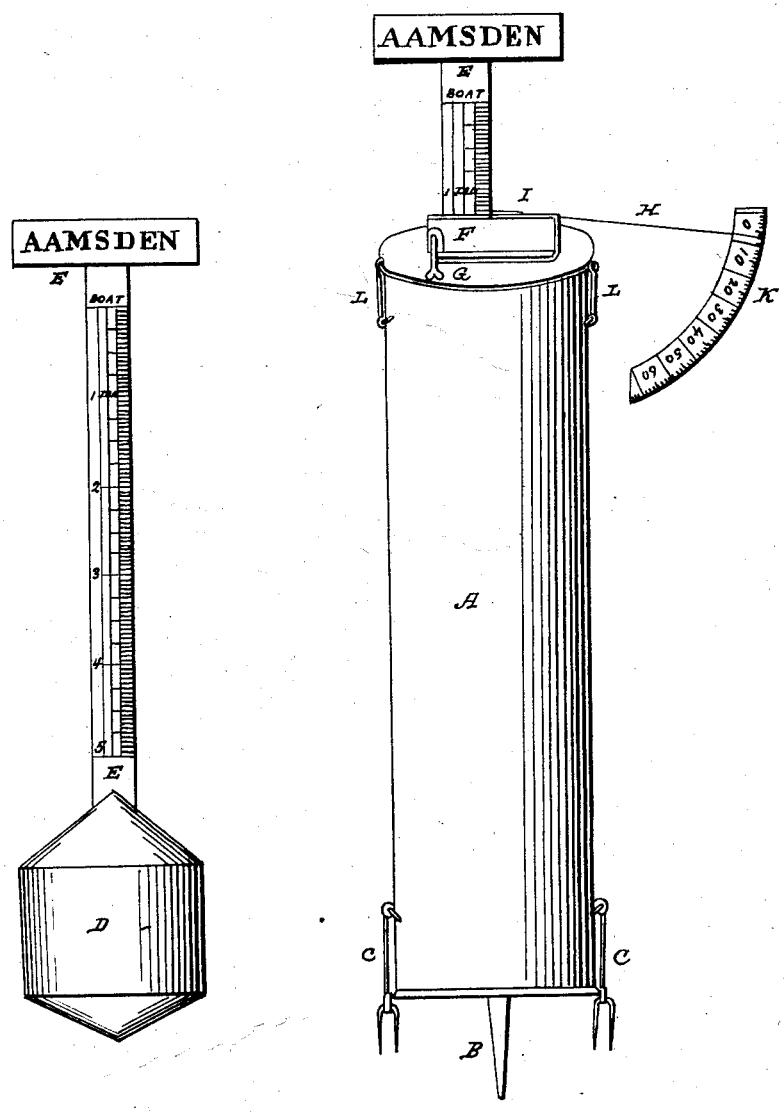

UNITED STATES PATENT OFFICE.

AMORY AMSDEN, OF ROCHESTER, NEW YORK.

MACHINE FOR ASCERTAINING THE WEIGHT OF CARGOES CONTAINED IN CANAL AND OTHER BOATS.

Specification of Letters Patent No. 810, dated June 27, 1838.

*To all whom it may concern:*

Be it known that I, AMORY AMSDEN, of Rochester, county of Monroe, and State of New York, have invented a new and useful Improvement in weighing or ascertaining the weight of the cargo contained in canal-boats when lying in the water by means of hydraulic facilities; also, all ships of burden, steam-boats, &c.; also for weighing tonnage at wharves and in nearly all other cases where a correct adjustment of weight is required; and I do hereby declare that the following is a full and exact description thereof.

The nature of my invention consists of a tube or cylinder of copper or some other suitable metal not liable to rust of some 8 or 12 inches, in length more than in depth which the boat or vessel sinks when lying in the water freighted to its full extent and from 5 to 12 inches in diameter according to the size of the boat or vessel to which it is to be attached with a lesser tube or pipe projecting from one end of sufficient length to reach from the floor of the boat or vessel down through to the water being from ⅜ to 1 inch in diameter at the extreme point and gradually enlarging to where it connects and is attached to the larger tube. (See accompanying draft.)

A, cylinder; B, tube or stem.

I now ascertain as near as possible the center or principal bearing of the boat or vessel bore or hole of such size as will fit the lower end of the tube or stem B, where I drive it until it becomes water tight and sesure it there by hooks and staples C. I then place the buoy D, to which is attached the gage E, into the cylinder when it is buoyed up by the water which has risen in the cylinder to a level with the water on the outside of the boat, or vessel. I then make a mark on the gage at the top edge of the guard F, and this mark shows the draft of the boat or vessel without any freight. I then freight the boat or vessel by placing upon it five, ten or twenty hundred pounds until it is freighted to its full extent, making a mark upon the gage as before at each draft. I then detach the gage and divide the intervening spaces upon it into hundred pounds as shown in the draft, and if it be necessary to reduce it still lower it can be done by attaching to the gage an index as represented in the draft.

G, screw, to secure the gage when making the mark; H, index; I, fulcrum; K, quadrant; L, clasps to hold fast the cover of the cylinder.

There may be instances where it will be found necessary to affix a cylinder like the one described at each end of the midship. Weighing at wharves and elsewhere will be done much in the same manner as that of boats, &c., by having a floating reservoir with a gage tube, &c.

What I claim as my invention and desire to secure by Letters Patent is—

The construction of the tube or stem receiving the water through the small aperture at the bottom and gradually enlarging until it connects with the cylinder thereby preventing a sudden rise or fall of water within and protecting the gage from being disturbed by any sudden motion of the boat or vessel or agitation of the water without, which is highly important when determining the weight of cargo and also in requiring so small a hole through the bottom of the boat or vessel as to produce no injury whatever and the advantage of being placed in the center of the boat or vessel is the same effect will be produced upon the gage by putting the freight in any part of the boat or vessel, the springing of the same being avoided by the use of iron bars or rods connecting with the deck and keel which cannot be represented in the draft or model, and lastly in weighing at wharves and elsewhere.

AMORY AMSDEN.

Witnesses:
E. B. WHEELER,
SAMUEL THRASHER.